UNITED STATES PATENT OFFICE.

FRANÇOIS RAYNAUD, OF TESSENDERLOO, BELGIUM, ASSIGNOR TO THE COMPAGNIE GÉNÉRALE L'ALUMINE, SOCIÉTÉ ANONYME, OF BRUSSELS, BELGIUM.

PROCESS OF MAKING ALUMINIUM-SODIUM CHLORID.

SPECIFICATION forming part of Letters Patent No. 599,111, dated February 15, 1898.

Application filed June 8, 1897. Serial No. 639,872. (No specimens.) Patented in Belgium November 19, 1896, No. 124,651.

*To all whom it may concern:*

Be it known that I, FRANÇOIS RAYNAUD, a French citizen, residing at Tessenderloo, Belgium, have invented new and useful Improvements in the Manufacture of Double Chlorid of Aluminium and Soda, (for which I have obtained a patent in Belgium, No. 124,651, bearing date November 19, 1896,) of which the following is a specification.

My invention consists in a new process of manufacture of double chlorid of aluminium and soda, and has for its object to render such manufacture more economical by dispensing with previous productions of chlorin gas.

In the processes heretofore employed for making chlorid of aluminium a current of chlorin has been passed over a mixture of aluminium and carbon brought to a bright red heat, and in order to obtain a double chlorid of aluminium and soda a certain quantity of sea-salt has been added to the mixture.

According to my invention a mixture is made of ferruginous bauxite and sea-salt and carbon and the mixture is molded into porous blocks. The proportions of the matters constituting the mixture are not invariable, but where the whole of the aluminium of the bauxite is to be converted into chlorid it is necessary that the mixture contain enough carbon to deoxidize it and enough sea-salt to furnish the chlorin necessary for the chloridation. The blocks thus formed are heated to redness in gas-retorts or other suitable receivers and subjected to the action of a current of sulfureted hydrogen, which converts the iron contained in the bauxite into sulfuret. The sulfureted hydrogen acts upon the oxid of iron contained in the bauxite and converts it into sulfid of iron, according to the reaction:

$$Fe_2O_3 + 3H_2S = Fe_2S_3 + 3H_2O.$$

When the sulfuration is complete, which can be ascertained by the escape of the sulfureted hydrogen at the outlet of the apparatus, the current of sulfureted hydrogen is stopped. A current of atmospheric air is made to act upon the blocks. The resulting oxidation converts the sulfuret of iron into peroxid, ($Fe_2O_3$,) and sulfurous gas ($SO_2$) is liberated; together with the excess of air, and the sulfurous gas ($SO_2$) reacts upon the sea-salt (NaCl) according to the well-known reaction applied in the Longman and other processes and which can be expressed as follows:

$$Fe_2S_3 + O_{15} + 6NaCl = Fe_2O_3 + \frac{3SO_2 + O_6 + 6NaCl}{3Na_2SO_4 + Cl_6}.$$

A well-known form of the above reaction is that which gives rise to the Hargreaves and other methods where steam is introduced and sodium sulfate and hydrochloric acid is obtained. In this reaction the nascent chlorin acts upon the aluminium oxid and the sodium chlorid and produces another well-known reaction:

$$Al_2O_3 + 3C + 2NaCl + Cl_6 = 2(AlCl_3, NaCl) + 3CO.$$

Double chlorid of aluminium and soda is set free in a volatile state and may be collected in suitable receivers. The iron becomes reconverted into peroxid, but as the reaction by which the chlorin gas is produced is often not at once complete when it is perceived that the evolution of chlorous vapors (the double salt produces white vapors) has ceased the sulfuration of the iron is renewed and afterward the blocks are again subjected to the action of atmospheric air, and these processes (sulfuration and oxidation) are alternately repeated until the whole of the aluminium is converted into chlorid.

The proportions suitable to obtain the reactions are not invariable. The amounts of carbon and sea-salt are calculated according to the yield of the aluminous ores, taking into account the above equations, but if it is desired to chlorurate the whole of the alumina contained in the bauxite a sufficient quantity of carbon (a small excess is not detrimental) to deoxidize it and a sufficient quantity of sea-salt to furnish the chlorin required must be used.

Having fully described my invention, what I claim, and desire to secure by Letters Patent, is—

The process of manufacture of double chlorid of aluminium and soda which consists in causing a current of sulfureted hydrogen and a current of atmospheric air to act alternately on a porous mixture of bauxite (ferruginous alumina) carbon and sea-salt heated to redness.

In witness whereof I have hereunto set my hand in presence of two witnesses.

FRANÇOIS RAYNAUD.

Witnesses:
  H. T. E. KIRKPATRICK,
  J. S. KIRKPATRICK.